United States Patent
Zaidi et al.

(10) Patent No.: US 10,193,802 B2
(45) Date of Patent: Jan. 29, 2019

(54) METHODS, SYSTEMS, AND COMPUTER READABLE MEDIA FOR PROCESSING MESSAGES USING STATEFUL AND STATELESS DECODE STRATEGIES

(71) Applicant: Oracle International Corporation, Redwood Shores, CA (US)

(72) Inventors: Syed Mohsin Reza Zaidi, Cary, NC (US); Lalit Grover, Haryana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 42 days.

(21) Appl. No.: 15/267,997

(22) Filed: Sep. 16, 2016

(65) Prior Publication Data
US 2018/0077057 A1    Mar. 15, 2018

(30) Foreign Application Priority Data

Sep. 13, 2016 (IN) .............................. 201641031155

(51) Int. Cl.
*H04L 12/715* (2013.01)
*H04L 12/725* (2013.01)

(52) U.S. Cl.
CPC ............ *H04L 45/64* (2013.01); *H04L 45/302* (2013.01)

(58) Field of Classification Search
CPC ..... H04L 45/64; H04L 45/302; H04L 12/715; H04L 12/725
See application file for complete search history.

(56) References Cited

U.S. PATENT DOCUMENTS 7,924,730 B1    4/2011  McAllister et al.
8,005,087 B2    8/2011  Dolganow et al.
(Continued)

FOREIGN PATENT DOCUMENTS

WO    WO 00/36793        6/2000
WO    WO 2018/182843 A1  10/2018

OTHER PUBLICATIONS

Advisory Action, Applicant-Initiated Interview Summary, and AFCP 2.0 Decision for U.S. Appl. No. 14/485,147 (dated Oct. 25, 2017).
(Continued)

*Primary Examiner* — Jung H Park
(74) *Attorney, Agent, or Firm* — Jenkins, Wilson, Taylor & Hunt, P.A.

(57) ABSTRACT

According to one method for processing a message containing TLV elements, the method includes receiving an ingress message containing a plurality of TLV elements. The method also includes determining, using at least one message related attribute, whether the ingress message is to be processed using a stateless decode algorithm. The method further includes in response to determining that the ingress message is to be processed using the stateless decode algorithm, processing the ingress message using the stateless decode algorithm. The method also includes determining, using the stateless decode algorithm, whether the ingress message includes at least one TLV element indicating that the ingress message is to be further processed using a stateful decode algorithm. The method further includes indicating that the ingress message is to be further processed using the stateful decode algorithm, processing the ingress message using the stateful decode algorithm.

20 Claims, 4 Drawing Sheets

(56) References Cited

U.S. PATENT DOCUMENTS

| | | | |
|---|---|---|---|
| 8,369,334 | B2 | 2/2013 | Yu |
| 8,514,871 | B2 | 8/2013 | Anschutz et al. |
| 8,756,337 | B1 | 6/2014 | Canion et al. |
| 9,037,729 | B2 | 5/2015 | Larkin |
| 9,602,405 | B1 | 3/2017 | Sharma et al. |
| 9,639,714 | B1 | 5/2017 | Carlson et al. |
| 9,819,719 | B2 | 11/2017 | Hasson et al. |
| 2002/0109879 | A1 | 8/2002 | Wing So |
| 2005/0182843 | A1 | 8/2005 | Reistad et al. |
| 2005/0242973 | A1 | 11/2005 | Liebl et al. |
| 2006/0129650 | A1 | 6/2006 | Ho et al. |
| 2009/0044231 | A1 | 2/2009 | Oh et al. |
| 2010/0158009 | A1 | 6/2010 | Lee et al. |
| 2011/0228794 | A1 | 9/2011 | Yong et al. |
| 2012/0191847 | A1 | 7/2012 | Nas et al. |
| 2012/0236734 | A1 | 9/2012 | Sampath et al. |
| 2012/0327779 | A1 | 12/2012 | Gell et al. |
| 2015/0043350 | A1 | 2/2015 | Basilier |
| 2015/0201045 | A1 | 7/2015 | Komirelly et al. |
| 2015/0310087 | A1* | 10/2015 | Tidwell ............ G06F 17/30569 713/189 |
| 2015/0319095 | A1 | 11/2015 | Stanwood et al. |
| 2016/0014142 | A1 | 1/2016 | Wang et al. |
| 2016/0077800 | A1 | 3/2016 | Zaidi et al. |
| 2016/0094418 | A1 | 3/2016 | Raney et al. |
| 2016/0371143 | A1 | 12/2016 | Resch et al. |
| 2017/0126569 | A1* | 5/2017 | Seed ..................... H04W 4/70 |
| 2017/0220655 | A1* | 8/2017 | Henrichs .......... G06F 17/30554 |
| 2017/0244628 | A1 | 8/2017 | Chen |
| 2018/0288127 | A1 | 10/2018 | Zaidi et al. |

OTHER PUBLICATIONS

Jamil et al., "Malicious Code Detection using Deep Packet Inspection," Riphah Institute of System Engineering (RISE) Islamabad, Pakistan, https://www.academia.edu/8054586/Malicious_Code_Detection_using_Deep_Packet_Inspection?auto=download, p. 1-8 (at least as early as Jul. 2016).

Fajardo et al., "Diameter Base Protocol," IETF RFC 6733, pp. 1-152 (Oct. 2012).

Final Office Action for U.S. Appl. No. 14/485,147 (dated Jul. 31, 2017).

Commonly-assigned, co-pending U.S. Appl. No. 15/473,519 for "Methods, Systems, and Computer Readable Media for Providing Message Encode/Decode as a Service," (Unpublished, filed Mar. 29, 2017).

Non-Final Office Action for U.S. Appl. No. 14/485,147 (dated Dec. 29, 2016).

Donovan, "Diameter Routing Message Priority," RFC 7944, pp. 1-18 (Aug. 2016).

Non-Final Office Action for U.S. Appl. No. 14/485,147 (dated Jun. 6, 2018).

Notification of Transmittal of the International Search Report and the Written Opinion of the International Searching Authority, or the Declaration for International Application No. PCT/US2018/016042 (dated Apr. 30, 2018).

Li et al., "Cloud Transcoder: Bridging the Format and Resolution Gap between Internet Videos and Mobile Devices," NOSSDAV' 12, pp. 33-38 (Jun. 7-8, 2012).

Non-Final Office Action for U.S. Appl. No. 15/473,519 (dated Sep. 7, 2018).

Commonly-assigned, co-pending International Patent Application Serial No. PCT/US18/16042 for "Methods, Systems, and Computer Readable Media for Providing Message Encode/Decode as a Service," (Unpublished, filed Jan. 30, 2018).

Applicant-Initiated Interview Summary for U.S. Appl. No. 15/473,519 (dated Nov. 20, 2018).

* cited by examiner

METHODS, SYSTEMS, AND COMPUTER READABLE MEDIA FOR PROCESSING MESSAGES USING STATEFUL AND STATELESS DECODE STRATEGIES

PRIORITY CLAIM

This application claims the priority benefit of Indian patent application number 201641031155, filed Sep. 13, 2016, the disclosure of which is incorporated herein by reference in its entirety.

TECHNICAL FIELD

The subject matter described herein relates to processing communications. More specifically, the subject matter relates to methods, systems, and computer readable media for processing messages using stateful and stateless decode strategies.

BACKGROUND

Type-length-value (TLV) elements, also known as attribute-value pair or information elements (IEs), are data constructs usable for providing information (e.g., attributes) in protocol packets or other messages. For example, a TLV element may include an identifier indicating a type or kind of information contained therein, a length of the information contained therein, and the value or information contained therein. Various communications protocols and/or data representation schemes (e.g., extensible markup language (XML)) may use TLV elements for exchanging and/or storing information. For example, Diameter and remote authentication dial in user service (RADIUS) are authentication, authorization, and accounting (AAA) protocols and use TLV elements to provide information in various messages.

Some message processing nodes may be configured to process (e.g., encode, decode, and/or other actions) messages containing TLV elements. For example, a Diameter signaling router may be configured to decode an ingress message containing TLV elements, modify the TLV elements, add TLV elements, remove TLV elements, encode an egress message containing the modified TLV elements and/or the additional TLV elements, and send the egress message to a destination. Accordingly, the performance of a message processing node may be dependent on the performance of decode and/or encode operations used for messages containing TLV elements. Existing solutions often use a decode strategy that store significant amounts of metadata (e.g., TLV element attribute data, TLV element locations, TLV element order, etc.) about messages in one or more data structures. As such, these solutions are generally resource inefficient (e.g., requiring more memory and/or processing resources), especially in scenarios where some or most of the messages are to be discarded.

SUMMARY

Methods, systems, and computer readable media for processing messages using stateful and stateless decode strategies are disclosed. According to one method for processing a message containing TLV elements, the method includes receiving an ingress message containing a plurality of TLV elements. The method also includes determining, using at least one message related attribute, whether the ingress message is to be processed using a stateless decode algorithm. The method further includes in response to determining that the ingress message is to be processed using the stateless decode algorithm, processing the ingress message using the stateless decode algorithm, wherein the stateless decode algorithm uses pointer arithmetic and length values associated with the plurality of TLV elements to decode the ingress message. The method also includes determining, using the stateless decode algorithm, whether the ingress message includes at least one TLV element indicating that the ingress message is to be further processed using a stateful decode algorithm. The method further includes indicating that the ingress message is to be further processed using the stateful decode algorithm, processing the ingress message using the stateful decode algorithm.

According to one system, the system includes at least one processor. The system also includes a message processing module (MPM) implemented using the at least one processor. The MPM is configured for receiving an ingress message containing a plurality of TLV elements; determining, using at least one message related attribute, whether the ingress message is to be processed using a stateless decode algorithm; in response to determining that the ingress message is to be processed using a stateless decode algorithm, processing the ingress message using the stateless decode algorithm, wherein the stateless decode algorithm uses pointer arithmetic and length values associated with the plurality of TLV elements to decode the ingress message; determining, using the stateless decode algorithm, whether the ingress message includes at least one TLV element indicating that the ingress message is to be further processed using a stateful decode algorithm; and in response to determining that the ingress message indicating that the ingress message is to be further processed using the stateful decode algorithm, processing the ingress message using the stateful decode algorithm.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the term "TLV element" refers to any information element (IE), attribute value pair (AVP), or other data construct usable for providing information in a communication protocol packet or message.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for processing messages with type-length-value (TLV) elements, e.g., information elements (IEs) and/or attribute value pairs (AVPs). When processing messages with TLV elements, stateful decoding strategies may store information about TLV elements while decoding messages. For example, stateful decode strategies in network applications typically involve storing metadata related to decoded, added, modified, or deleted TLV elements, among other things.

During an overload event, stateful decoding strategies may exacerbate load issues since updating data structures for storing metadata may utilize significant memory and processing resources. For example, during an overload event, messages may need to be prioritized based on their contents in order to guarantee quality of service (QoS) for certain users or usages. In this example, using a stateful decode strategy to determine packet priority during overload conditions, especially when a significant portion of traffic is going to be discarded without further processing, only exacerbates the load on the system. Moreover, using a stateful decode strategy for all message processing can be unnecessary and inefficient for certain scenarios and messages. For example, memory and processing resources are wasted when metadata is maintained for TLV elements that are only inspected or read once and never modified.

In accordance with some aspects of the subject matter described herein, techniques, methods, systems, or mechanisms are disclosed for using a stateless decode strategy (e.g., algorithm) in conjunction with a stateful decode strategy. For example, a stateless decode algorithm may store little to no metadata while traversing a message and may be usable for quickly determining which messages are low priority and are to be discarded (e.g., by traversing a message for one or more priority related AVP or priority indicators). In this example, a stateful decode algorithm may be utilized for processing high priority messages (e.g., the messages that are not discarded) and storing relevant metadata for these messages.

In accordance with some aspects of the subject matter described herein, techniques, methods, systems, or mechanisms are disclosed for storing and sharing validation information among decode algorithms. For example, a stateless decode algorithm may perform structural and/or semantic validation during message decoding and may maintain a validation pointer or validation information indicating a point up to which the message has been validated. In this example, a stateful decode algorithm may decode a subsequent portion of the message and may use the validation information gathered or obtained by the stateless decode algorithm, thereby eliminating any duplicate validation costs by synergizing the two decode strategies and re-using validation results between them.

Advantageously, in accordance with some aspects of the subject matter described herein, by using stateless and stateful decode strategies for decoding messages containing TLV elements, significant message processing gains are made over other strategies, especially in scenarios where some or most messages are to be discarded instead of being fully processed. For example, by using a stateless decode algorithm to identify high priority messages (e.g., messages associated with emergency first responders) during an overload event, other messages can be quickly discarded, thereby allowing more high priority messages to be further processed (e.g., using a stateful decode algorithm). Further, by sharing validation information among decode algorithms, validation costs associated with message decoding may be minimized since validation information is re-used and unnecessary duplicate validation (e.g., revalidation) is avoided.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
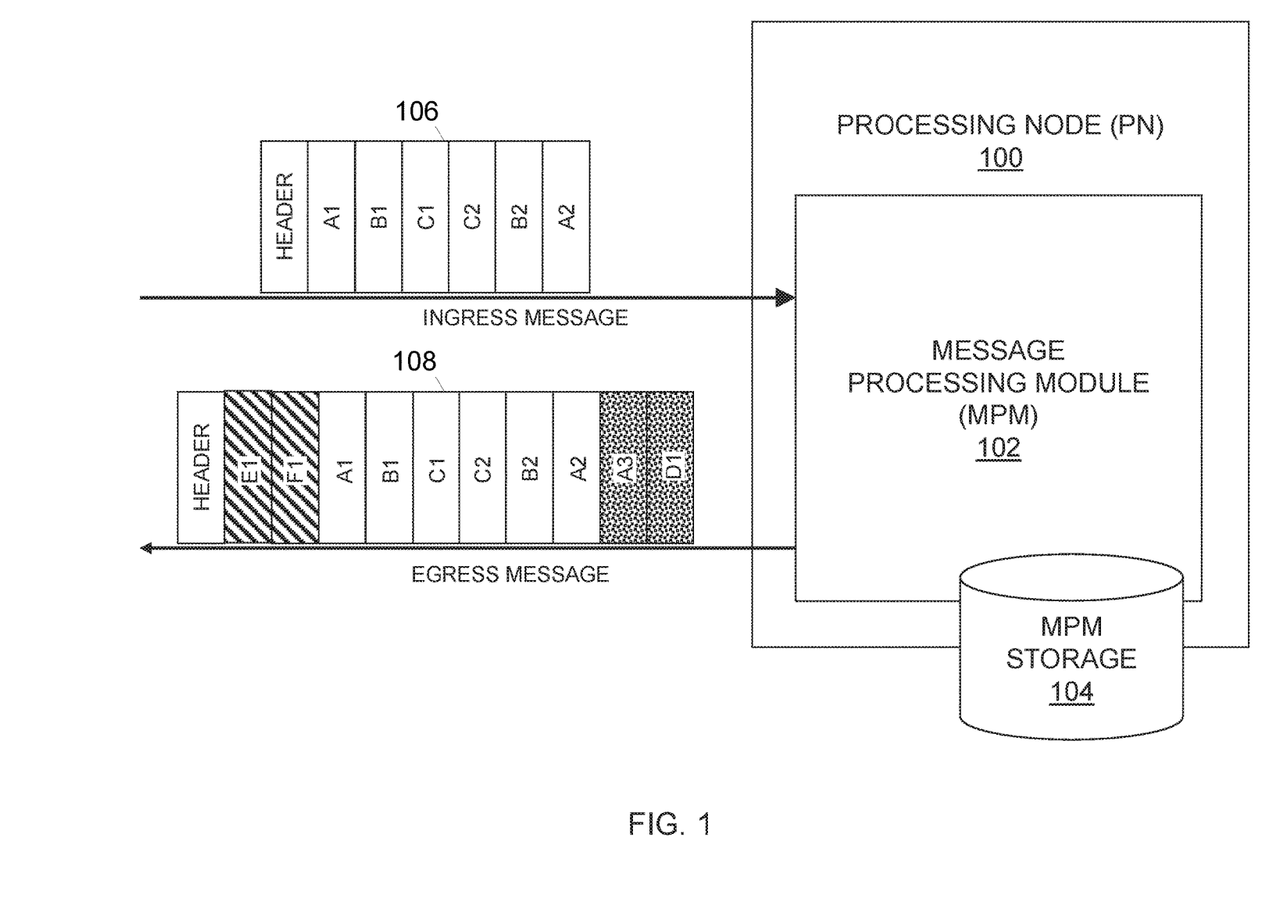
FIG. 1 is a diagram illustrating an example processing node.

FIG. 1 is a diagram illustrating an example processing node (PN) 100 according to an embodiment of the subject matter described herein. Referring to FIG. 1, PN 100 may include a message processing module (MPM) 102 and an MPM storage 104. PN 100 may represent any suitable entity or entities (e.g., one or more computing platforms, a computing device, and/or software executing on a processor) for performing one or more aspects associated with processing (e.g., encoding and/or decoding) messages containing one or more TLV elements. For example, PN 100 may be configured to receive, process, and/or send messages containing one or more TLV elements. Example PN 100 may include, but is not limited to, a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, or a network device.

In some embodiments, PN 100 may include functionality for receiving and/or sending messages associated with one or more communications protocols. For example, PN 100 may include various communications interfaces for communicating with nodes using a Diameter protocol, a RADIUS protocol, a common open policy service (COPS) message, a link layer discovery protocol (LLDP), an intermediate system to intermediate system (IS-IS) protocol, and/or other protocols, e.g., that use TLV or TLV like elements.

MPM 102 may represent any suitable entity or entities (e.g., a field-programmable gate array (FPGA), an application-specific integrated circuit (ASIC), and/or software executing on a processor) for performing one or more aspects associated with processing messages containing one or more TLV elements. For example, MPM 102 may be configured to receive, process, encode, decode, and/or send messages containing one or more TLV elements. Example processing performable by MPM 102 may include identifying TLV elements and/or related attributes, modifying TLV elements and/or related attributes, and/or decoding and/or encoding messages containing TLV elements. For example, MPM 102 may decode certain TLV elements in a received message in response to receiving a request from a user or other entity. MPM 102 may also include functionality for storing information about decoded and/or detected (e.g., inspected) TLV elements, such as when using a stateful decode algorithm. For example, MPM 102 may use stored information about decoded TLV elements in generating or encoding at least some egress messages.

In some embodiments, MPM 102 may include functionality for using a stateless decode algorithm in conjunction with a stateful decode algorithm to decode various messages containing TLV elements. For example, a stateless decode algorithm may avoid storing or updating some, if not all, metadata when decoding messages, while a stateful decode algorithm may store or update metadata when decoding messages. In this example, since some messages may include TLV elements that are only read once and never modified, a stateless decode algorithm may be preferable for decoding since a stateful decode algorithm would potentially use more processing and memory resources and would store unnecessary metadata. Additional details regarding an example stateful decode strategy and/or related algorithms is found in U.S. patent application Ser. No. 14/485,147, entitled METHODS, SYSTEMS, AND COMPUTER READABLE MEDIA FOR PROCESSING DATA CONTAINING TYPE-LENGTH-VALUE (TLV) ELEMENTS, filed Sep. 12, 2014; the disclosure of which is incorporated herein by reference in its entirety.

In some embodiments, MPM 102 may include functionality for using a stateless decode algorithm for processing one or more messages (e.g., without using a stateful decode algorithm). For example, MPM 102 may use a stateless decode algorithm for reading a Destination-Host AVP in a Diameter message and may use this information when routing the Diameter message to a relevant peer without having to redo any TLV element decoding. In this example, since MPM 102 does not need to store metadata for processing the Diameter message, MPM 102 can avoid using a stateful decode algorithm for decoding this Diameter message.

In some embodiments, MPM 102 may use a stateless decode algorithm to identify high priority packets from other packets before processing the high priority packets using a stateful decode algorithm. For example, MPM 102 may utilize these complimentary algorithms to decode a significantly higher amount of incoming traffic than when solely using a stateful decode algorithm since a stateful decode algorithm typically stores a significant amount of metadata for each decoded message in one or more data structures and updating the data structures with metadata requires significant time and processing resources.

In some embodiments, a stateless decode algorithm may use pointer arithmetic for traversing a message, e.g., by updating an byte offset value, as TLV elements are decoded, using length attribute values in the decoded TLV elements. In some embodiments, a stateless decode algorithm may maintain minimal contextual information (e.g., a bit or byte offset value indicating a location in the message being decoded) and/or a validation pointer indicating a point in the message being decoded that is structurally validated) to decode both top-level and nested (e.g., to any depth or a pre-defined maximum depth) TLV elements without storing message metadata. In some embodiments, a stateless decode algorithm may be "lazy" in that decoding (e.g., traversal) of a message occurs until a requested TLV element is located.

In some embodiments, MPM 102 may include functionality for determining whether and/or when to use a stateless decode algorithm prior to or in lieu of a stateful decode algorithm. For example, MPM 102 may lower decoding costs (e.g., processing and/or memory resource usage) associated with message processing (e.g., during an overload event or otherwise) by enabling an optimized one-time inspection of message contents. In this example, MPM 102 may determine that messages associated with end node application may be processed using a stateless decode algorithm since end node applications typically do not need to modify or re-encode incoming packets.

In some embodiments, MPM 102 may include functionality for switching or changing a decode strategy prior to fully processing a message. For example, MPM 102 may decode a portion of ingress message 106 using a stateless decode algorithm and then determine that another portion of ingress message 106 is to be decoded using a stateful decode algorithm. In another example, a stateless decode algorithm may be used after a stateful decode algorithm has already decoded part of a message. In this example, the stateless decode algorithm can read or utilize any metadata gathered or stored by the stateful decode algorithm, e.g., without modifying the metadata and thereby keeping the stateless decode algorithm's speed and/or performance.

In some embodiments, performance benefits of a stateless decode algorithm may increase further with regard to a stateful decode algorithm, especially when multiple TLV element instances need to be traversed to find a particular instance. For example, using a stateless decode algorithm, MPM 102 may experience twice the gains (e.g., resources saved) with regard to a stateful decode algorithm when finding a second instance of an AVP than when finding a first instance of the AVP. That is, in this example, while a stateful decode algorithm would perform two metadata updates when decoding and storing metadata for the two instances of the AVP, a stateless decode algorithm would perform no metadata updates regardless of the number of instances.

In some embodiments, MPM 102 may maintain or update a validation pointer or other validation information when decoding ingress message 106. Continuing with this example, validation information gathered or determined by a first decode algorithm may be available to or shared with subsequent decode algorithms so as to avoid re-validating portions of ingress message 106 that were validated by a prior decode algorithm.

In some embodiments, MPM 102 may include functionality for using multiple decode algorithms during an overload event, e.g., where PN 100 and/or MPM 102 are overloaded. For example, during an overload event, a Diameter message may be received for processing. MPM 102 may determine that the Diameter message is to be decoded using a stateless decode algorithm based on various message related attributes, such as a connection identifier and/or an interface (e.g., a Gx or Rx interface) the Diameter message is received on and its header content. The stateless decode algorithm may be used to inspect the Diameter message for Diameter AVPs indicating the need for prioritized processing. If determined to be high priority, MPM 102 may further process the Diameter message. If not, then the Diameter message may be discarded during the overload event. Further processing may include inspecting the Diameter message using stateless and/or stateful decode algorithms and may involve determining message treatment (e.g., whether to forward, discard, process using a locally hosted application). In some embodiments, for Diameter AVPs that do not typically need to be re-inspected or modified during the remainder of message processing, MPM 102 may decode these AVPs using a stateless decode algorithm, but may decode other AVPs using a stateful decode algorithm.

In some embodiments, MPM 102 may include or access MPM storage 104. MPM storage 104 may represent any suitable entity or entities (e.g., non-transitory computer readable media, flash memory, random access memory, and/or a storage device) for storing information related to TLV elements (e.g., TLV element attributes, TLV element type information, TLV element length or size information, TLV element values, ingress offset values and/or egress offset values) and/or related data structures. For example, MPM storage 104 may store a decode iterator and/or validation information for each ingress and/or egress message being processed. In some embodiments, MPM storage 104 may be external to and/or or integrated with PN 100 and/or MPM 102.

In some embodiments, MPM 102 may include one or more communications interfaces for interacting with users and/or nodes. For example, MPM 102 may include communications interfaces for receiving and/or sending Diameter messages, RADIUS messages, COPS messages, LLDP messages, IS-IS messages, and/or other messages. In another example, MPM 102 may include a communications interface for communicating with a network operator and/or a network management node. In this example, MPM 102 may receive a processing request from an entity (e.g., via an application programming interface, an encode and/or decode library (EDL) call, or other mechanism) for decoding ingress messages and/or encoding egress messages or performing related operations.

In some embodiments, MPM 102 may be configured to provide constant-time lookups (e.g., lookups that require a similar amount of time and are not affected by the size of a data structure) of TLV elements, e.g., based on TLV attributes. For example, MPM 102 may store information in an associative container (e.g., an associative array, a hash map, or other related data structure) and/or other data structures that provide or allow constant-time lookups. For example, an associative array may include TLV instance containers (e.g., arrays or vectors containing information about TLV elements of a particular type) indexed using hash values corresponding to TLV related tags and/or TLV vendor identifiers (IDs). In this example, assuming no collisions, the lookup in the associative array may include an amount of time needed to perform a single operation and this amount of time may not change significantly regardless of the size of the associative array.

In some embodiments, MPM 102 may be configured to provide optimized (e.g., need-based or lazy) decoding of TLV elements from ingress messages (e.g., packets). For example, MPM 102 may be configured to "walk" through a packet comparing TLV attributes (e.g., TLV element tags) or validating message structure without performing any extra operations for non-matching TLV elements. In this example, MPM 102 may be configured to "walk" only as far as necessary to obtain information about a requested TLV element.

In some embodiments, MPM 102 may be configured to determine and to store positions (e.g., offset values) of TLV elements in ingress messages (e.g., in one or more data structures). In such embodiments, position information may be usable to permit read-only operations without actually storing values of the TLV elements. By storing position information in lieu of storing values or other attributes of TLV elements, resources and time may be saved (e.g., by avoiding potentially expensive memory related operations in scenarios where the existence or location of a TLV element is requested but not the actual value therein).

In some embodiments, MPM 102 may include functionality for a multi-instance stateless decode algorithm operation. For example, MPM 102 may utilize multiple instances of a stateless decode algorithm on a Diameter message containing multiple instances of an Auth-Application-Id AVP. In this example, each instance of a stateless decode algorithm may decode a different instance of the Auth-Application-Id AVP once without any modifications to them or additions of any new such AVPs. In some embodiments, involving a multi-instance stateless decode operation, MPM 102 and/or each instance of a stateless decode algorithm may traverse a message, where the start offset values of AVP instances may be found and stored into an data structure for return to a caller, e.g., without performing any metadata updates associated with the decoded AVP instances.

In some embodiments, MPM 102 may be configured to provide optimized encoding of TLV elements into egress messages. For example, a stored position (e.g., an ingress offset value) of a TLV element in an ingress packet may allow for optimized encoding of an egress packet by copying non-modified TLV elements directly from the ingress packet, thereby avoiding extra operations. In another example, a position (e.g., an egress offset value) of a TLV element in an egress packet may be stored and used for copying modified/added TLV elements from a previously encoded egress packet, e.g., if such TLV elements have not been modified since the last encode, thereby avoiding extra operations.

In some embodiments, MPM 102 may use an encode iterator (e.g., a pointer object) that maintains a position (e.g., an offset value) for each message being encoded. In this example, MPM 102 may initialize a encode iterator at the beginning of a message and as TLV elements are inserted into egress message 108, MPM 102 may increment the encode iterator such that the encode iterator maintains the position for the next TLV element to be inspected in the message. In some embodiments, MPM 102 may use multiple decode iterators for egress message 108.

Ingress message 106 may represent any message (e.g., packet) containing one or more TLV elements that may be received, processed, and/or decoded by MPM 102. For example, ingress message 106 may represent a Diameter message, a RADIUS message, a COPS message, a LLDP message, or an IS-IS message. As depicted in FIG. 1, ingress message 106 may include multiple TLV elements, of the same or different types. For example, each TLV element type may be represented by a letter, such as "A", "B", "C", and/or "D". In this example, each TLV element (e.g., of a particular TLV element type) may be represented by a number after a particular letter, such as "A1", "A2", and "A3".

In some embodiments, MPM 102 may be configured to receive ingress message 106 and/or to perform one or more operations associated with processing TLV elements associated with ingress message 106. For example, MPM 102 may be configured to receive EDL related requests (e.g., a request for determining whether certain TLV elements exists in ingress message 106 and/or for determining values of certain TLV elements in ingress message 106. In response, MPM 102 may be configured to inspect TLV elements (e.g., via associated tags) in ingress message 106 and, if requested TLV elements are found, provide appropriate responses for the EDL related requests.

Egress message 108 may represent any message (e.g., a packet) containing one or more TLV elements and may be generated and/or encoded by MPM 102. For example, egress message 108 may represent a Diameter message, a RADIUS message, a COPS message, a LLDP message, or an IS-IS message. As depicted in FIG. 1, egress message 108 may include multiple TLV elements, of the same or different types. For example, each TLV element type may be represented by a letter, such as "A", "B", "C", and/or "D". In this example, each TLV element may be represented by a number after a particular letter, such as "A1", "A2", and "A3".

In some embodiments, egress message 108 may include TLV elements decoded from ingress message 106. For example, TLV elements "A1", "B1", "C1", "C2", and "A2" may be decoded from ingress message 106 and information about these TLV elements may be stored in MPM storage 104 and may be used when encoding egress message 108.

In some embodiments, egress message 108 may include TLV elements from ingress message 106 that were not decoded and/or modified. For example, TLV element "B2" may be included from ingress message 106. In this example, MPM 102 may be configured to determine that some portions of ingress message 106 may be copied directly into egress message 108.

In some embodiments, egress message 108 may include TLV elements different from or in addition to those in ingress message 106. For example, TLV elements "E1", "F1", "A3", and "D1" may be added and/or modified by MPM 102 and used when encoding egress message 108.

In some embodiments, MPM 102 may be configured to generate and/or encode egress message 108 and/or to perform one or more operations associated with processing TLV elements associated with egress message 108. For example, MPM 102 may be configured to modify a first TLV element associated with a tag "A" (e.g., a TLV element "A1") containing a destination address for ingress message 106, to encode egress message 108 containing the modified TLV element, and to send egress message 108 to an appropriate destination. In this example, MPM 102 may modify, using one or more data structures containing information about various decoded TLV elements in ingress message 106, TLV element "A1" to include a relevant destination address and include the modified TLV element in egress message 108.

It will be appreciated that FIG. 1 is for illustrative purposes and that various data structures and/or functionality described above in relation to FIG. 1 may be changed, altered, added, or removed. For example, some nodes and/or functions may be combined into a single entity. In another example, some nodes and/or functions may be distributed across multiple nodes and/or platforms.

Figure 2:
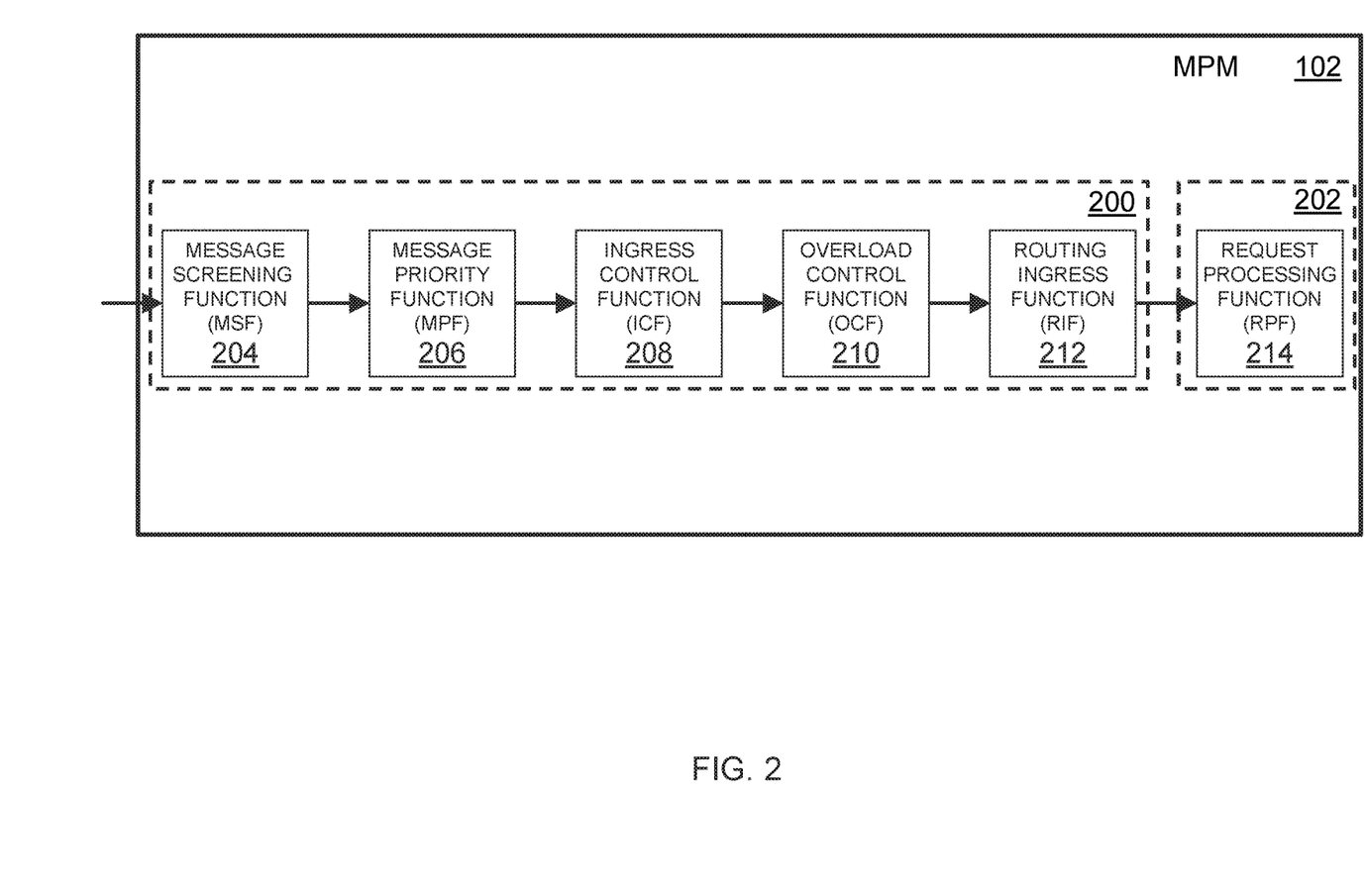
FIG. 2 is a diagram illustrating example functions associated with message processing.

FIG. 2 is a diagram illustrating example functions associated with message processing. Referring to FIG. 2, MPM 102 may include a connection function group 200 and a routing function group 202. Connection function group 200 may include various functions associated with received messages and/or a connection layer. In some embodiments, connection function group 200 may include a message screening function (MSF) 204, a message priority function (MPF) 206, an ingress control function (ICF) 208, overload control function (OCF) 210, and a routing ingress function (RIF) 212.

MSF 204 may be any suitable entity (e.g., software executing on at least one processor) for screening messages. For example, MSF 204 may discard invalid transactions, e.g., malformed or orphaned messages. MPF 206 may be any suitable entity (e.g., software executing on at least one processor) for assigning or determining message priorities. For example, MPF 206 may utilize a message priority scheme where "P0"-"P4" represent increasing levels of message priority. Message priority "P4" may represent the highest message priority and may be assigned to next generation networks priority services (NGN-PS) messages (e.g., messages associated with emergency first responders). Message priority "P3" may represent the second highest level of message priority and may be assigned to answer messages. Message priorities "P2", "P1", and "P0" may represent decreasing levels of message priority and any of these priorities may be assigned to request messages.

In some embodiments, MPF 206 may utilize a message priority scheme based on a Diameter routing message priority (DRMP) standard defined in Internet Engineering Task Force (IETF) Request for Comments (RFC) 7944; the disclosure of which is incorporated herein by reference in its entirety. For example, using a DRMP standard, "P0"-"P15" may represent increasing levels of message priority. In this example, message priority "P15" may represent the highest message priority and may be assigned to NGN-PS messages, while message priorities "P0"-"P14" may be assigned to other messages.

In some embodiments, MPF 206 may adjust message priority for messages in certain situations, e.g., in response to an overload event. For example, MPF 206 may police or monitor rates of message for various message priorities. In this example, if MPM 102 receives more than a maximum rate (e.g., (15% of an engineered server capacity) of "P4" messages, some "P4" messages may be reassigned to "P3". Continuing with this example, if MPM 102 receives less than the maximum rate of "P4" messages, "P4" messages may be inviolable (e.g., not reassigned) and may be allowed to bypass all congestion controls for providing guaranteed service. In some embodiments, MPF 206 may utilize one or more stateless decode algorithms to find TLV elements or other information that indicates message priority, e.g., one or more priority AVPs. For example, MPF 206 may use a stateless decode algorithm to quickly walk through ingress message 106 until a priority AVP is found. In some embodiments, if a system is experiencing an overload event, MPF 206 may utilize one or more stateless decode algorithms to identify and discard low priority messages without incurring the full cost of decoding such messages using a stateful decode algorithm.

ICF 208 may be any suitable entity (e.g., software executing on at least one processor) for controlling the rate and/or amount of ingress message. In some embodiments, ICF 208 may police maximum connection rates for various connections related to ingress messages and discard messages that exceed these connection rates. In some embodiments, ICF 208 may also police reserved connection rates and may color or otherwise mark messages based on whether the messages are associated with high message rate (e.g., loaded) connections, e.g., "green"=normal load, yellow=significant load, and "red"=overload detected.

OCF 210 may be any suitable entity (e.g., software executing on at least one processor) for handling and/or managing traffic during overload events. In some embodiments, if PN 100 or a related processor is experiencing overload, OCF 210 may police messages based on a predetermined message rate (e.g., an engineered or preferred message rate) and may discard messages that exceed the predetermined message rate. In some embodiments, if PN 100 or a related processor is not experiencing overload, OCF 210 may police messages based on a maximum message rate (e.g., a rate higher than an engineered message rate) and may discard messages that exceed the maximum message rate.

RIF 212 may be any suitable entity (e.g., software executing on at least one processor) for routing ingress messages. For example, RIF 212 may route ingress message 106 to one or more message processors internal to PN 100 for application related processing. In another example, RIF 212 may route ingress message 106 to routing function group 202 or functions therein for determining how to process ingress message 106 and/or where to route ingress message 106.

Routing function group 202 may include various functions associated with routing messages and/or a routing layer. In some embodiments, routing function group 202 may include a request processing function (RPF) 214. RPF 214 may be any suitable entity (e.g., software executing on at least one processor) for processing request messages. For example, RPF 214 may decode ingress message 106 using a stateful decode algorithm. In this example, RPF 214 may store metadata associated with ingress message 106 and may use this metadata when generating response message 108 to ingress message 106.

It will be appreciated that FIG. 2 is for illustrative purposes and that various entities and/or functionality described above in relation to FIG. 2 may be changed, altered, added, or removed. For example, some nodes and/or functions may be combined into a single entity, e.g., MPM 102. In another example, some nodes and/or functions may be distributed across multiple nodes and/or platforms.

Figure 3:
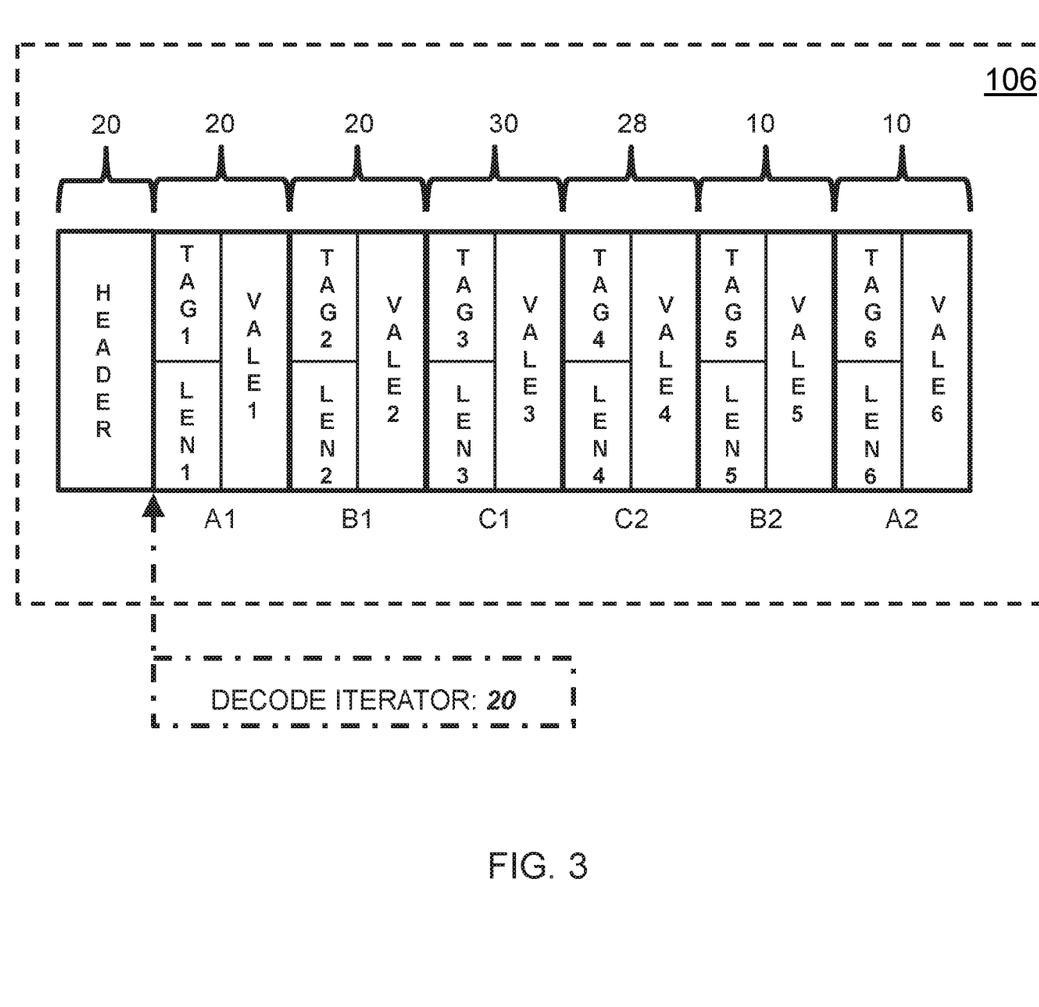
FIG. 3 is a diagram illustrating an example ingress message containing TLV elements.

FIG. 3 is a diagram illustrating ingress message 106 containing TLV elements. Referring to FIG. 3, ingress message 106 may include multiple TLV elements, e.g., "A1", "B1", "C1", "C2", "B2", and "A2". Each TLV element may include a tag attribute value representing the name or type of TLV element, a length attribute value representing the total length or size (e.g., in bytes) of the TLV element, and a value attribute value representing data of the TLV element.

In some embodiments, MPM 102 may include functionality for "walking through" messages containing TLV elements. For example, MPM 102 may use a decode iterator (e.g., a pointer object) that maintains a position (e.g., an offset value) for each message being decoded. In this example, MPM 102 may initialize a decode iterator at the beginning of a message and as TLV elements and/or related tags are inspected, MPM 102 may increment the decode iterator such that the decode iterator maintains the most recent position inspected in the message or the position to be inspected next.

In some embodiments, MPM 102 may use multiple decode iterators for a particular message. For example, MPM 102 may use a decode iterator for each TLV element type encountered. Continuing with this example, MPM 102 may use a decode iterator to quickly find a next TLV element of a particular type since MPM 102 can continue "walking through" a message from the last position inspected.

In some embodiments, MPM 102 may use a stateless decode algorithm for decoding or "walking through" ingress message 106 and may use pointer arithmetic when updating a decode iterator. For example, after inspecting a header having a length or size discernible by MPM 102, MPM 102 may start decoding ingress message 106 by reading or inspecting the first TLV element, e.g., TLV element 'A1'. In this example, MPM 102 may inspect a length attribute value of the first TLV element (e.g., "Len1"=20) and may add the length attribute value and a byte offset value (e.g., 20) representing a decode iterator for computing an updated decode iterator (e.g., 40) which may point to the next TLV element, TLV element "B1". Continuing with this example, MPM 102 may continue "walking through" ingress message 106 using the stateless decode algorithm until a particular TLV element is found or until MPM 102 determines to use a different decode algorithm, e.g., a stateful decode algorithm.

It will be appreciated that FIG. 3 is for illustrative purposes and that various entities and/or functionality described above in relation to FIG. 3 may be changed, altered, added, or removed.

Figure 4:
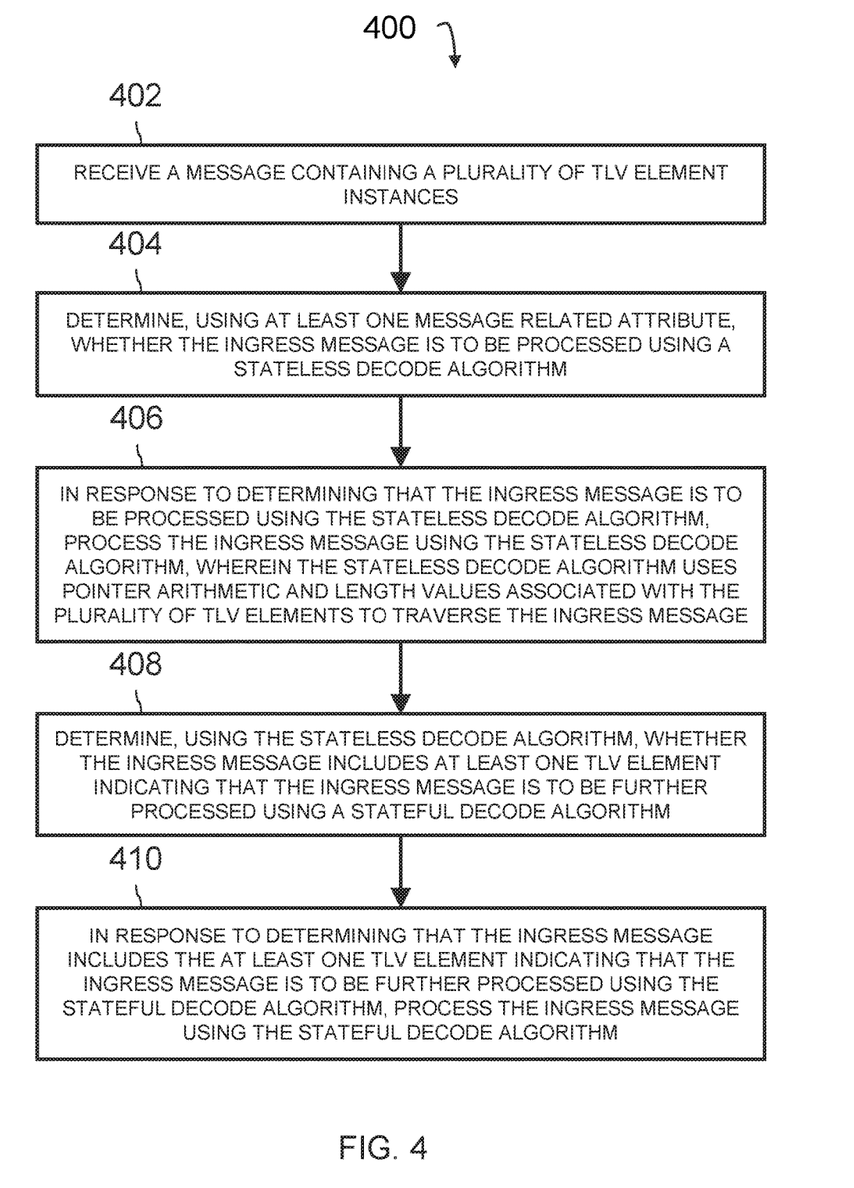
FIG. 4 is a diagram illustrating an example process for processing a message containing TLV elements.

FIG. 4 is a diagram illustrating an example process 400 for processing a message containing TLV elements. In some embodiments, example process 400, or portions thereof, may be performed by or at PN 100, MPM 102, and/or another node, function, or module. In some embodiments, example process 400 may include steps 402, 404, 406, 408, and/or 410.

Referring to example process 400, in step 402, an ingress message containing a plurality of one or more TLV elements may be received. For example, MPM 102 may receive ingress message 106 from a source node.

In some embodiments, ingress message 106 may include a Diameter message, a RADIUS message, a COPS message, a LLDP message, or an IS-IS message.

In step 404, it may be determined, using at least one message related attribute, that the ingress message is to be processed using a stateless decode algorithm.

In some embodiments, a message related attribute may include a Diameter interface associated with the ingress message, a related connection or path identifier associated with the ingress message, an origination realm, an origination address, a destination realm, a destination address, a priority related TLV element in the ingress message, or an NGN-PS TLV element in the ingress message.

In step 406, in response to determining that the ingress message is to be processed using the stateless decode algorithm, the ingress message may be processed using the stateless decode algorithm, wherein the stateless decode algorithm uses pointer arithmetic and length values associated with the plurality of TLV elements to decode the ingress message. For example, PN 100 or MPM 102 may be configured to use a stateless decode algorithm that maintains an offset value indicative of a position or location in a message to be decoded. In this example, the stateless decode algorithm may decode a next TLV element in the message by incrementing the offset value by a length value of a current TLV element.

In step 408, it may be determined, using the stateless decode algorithm, whether the ingress message includes at least one TLV element indicating that the ingress message is to be further processed using a stateful decode algorithm. For example, MPM 102 may use a stateless decode algorithm to traverse a message looking for a Diameter AVP indicating a high priority message. In this example, if MPM 102 finds the Diameter AVP, MPM 102 may use a stateful decode algorithm to further process the message and store relevant metadata associated with the message in one or more data structures.

In some embodiments, a TLV element may include a top-level TLV element, a nested TLV element, a priority related TLV element or an NGN-PS TLV element.

In some embodiments, determining that an ingress message includes at least one TLV element indicating that the ingress message is to be further processed using a stateful decode algorithm may include determining that the at least one TLV element is to be read multiple times or determining that the at least one TLV element indicates that the ingress message is to receive preferential treatment. For example, PN 100 or MPM 102 may be configured to identify priority AVPs in Diameter messages and may determine whether the Diameter messages are to be processed based on values in those priority AVPs. In another example, PN 100 or MPM 102 may be configured to identify route-record AVPs in Diameter messages and may determine that information in these AVPs will be read, accessed, or used multiple times when generating an answer message. In this example, PN 100 or MPM 102 may be configured to use a stateful decode algorithm so as to store this information in one or more data structures for constant-time lookups.

In step 410, in response to determining that the ingress message includes the at least one TLV element indicating that the ingress message is to be further processed using the stateful decode algorithm, the ingress message may be processed using the stateful decode algorithm.

In some embodiments, processing an ingress message using a stateless decode algorithm or a stateful decode algorithm may include updating, as the ingress message is decoded, validation information for indicating a validated portion of the ingress message. For example, PN 100 or MPM 102 may be configured for updating an offset value or pointer indicating that a message has been validated up to a location in the message represented by the offset value or pointer.

In some embodiments, processing an ingress message may include using validation information obtained or updated by a stateless decode algorithm or a stateful decode algorithm. For example, PN 100 or MPM 102 may be configured such that validation information is shared between various decode algorithms for avoiding revalidating the validated portion of the ingress message.

In some embodiments, in response to determining that an ingress message does not include at least one TLV element indicating that the ingress message is to be further processed using a stateful decode algorithm, the ingress message may be discarded when the processing node is experiencing an overload event. For example, during an overload event, PN 100 may be unable to process all received messages. In this example, PN 100 or MPM 102 may be configured for filtering these messages using a stateless decode algorithm by discarding messages that are not high priority, e.g., as determined by one or more TLV elements or other priority indicators.

In some embodiments, MPM 102 may be located at PN 100, e.g., a computing platform, a signaling router, a routing agent, a relay agent, a forwarding agent, a DSR, a Diameter node, a RADIUS node, a RADIUS signaling router, a network router, a network switch, or a network device. In some embodiments, PN 100 may be implemented at or by a virtualized node, e.g., a virtualized DSR or other virtualized signaling router executing using one or more processors or computing platforms.

It should be noted that PN 100, MPM 102, and/or functionality described herein may constitute a special purpose computing device. Further, PN 100, MPM 102, and/or functionality described herein can improve the technological field of processing messages containing TLV elements, including techniques for decoding and/or encoding TLV elements.

The subject matter described herein for processing messages using stateful and stateless decode strategies can improve the functionality of a message processor and related message processing nodes by providing for more efficient resource (e.g., memory) utilization and improved processing speeds. Further, by using stateless and stateful decode strategies, high priority messages can be identified and processed even when PN 100 is experiencing an overload event. It should also be noted that a computing platform that implements the subject matter described herein may comprise a special purpose computing device usable to encode and/or decode TLV elements during various scenarios, e.g., during an overload event.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for processing a message containing type-length-value (TLV) elements, the method comprising:
    at a processing node including at least one message processor, wherein the processing node shares validation information about an ingress message among decode algorithms:
        receiving the ingress message containing a plurality of TLV elements;
        determining, using at least one message related attribute, whether the ingress message is to be processed using a stateless decode algorithm;
        in response to determining that the ingress message is to be processed using the stateless decode algorithm, processing the ingress message using the stateless decode algorithm, wherein the stateless decode algorithm uses pointer arithmetic and length values associated with the plurality of TLV elements to decode the ingress message;
        determining, using the stateless decode algorithm, whether the ingress message includes at least one TLV element indicating that the ingress message is to be further processed using a stateful decode algorithm; and
        in response to determining that the ingress message includes the at least one TLV element indicating that the ingress message is to be further processed using the stateful decode algorithm, processing the ingress message using the stateful decode algorithm.

2. The method of claim 1 comprising, in response to determining that the ingress message does not include the at least one TLV element indicating that the ingress message is to be further processed using the stateful decode algorithm, discarding the ingress message when the processing node is experiencing an overload event.

3. The method of claim 1 wherein determining that the ingress message includes the at least one TLV element indicating that the ingress message is to be further processed using the stateful decode algorithm includes determining that the at least one TLV element is to be read multiple times or determining that the at least one TLV element indicates that the ingress message is to receive preferential treatment.

4. The method of claim 1 wherein the at least one TLV element includes a top-level TLV element, a nested TLV element, a priority related TLV element or a next generation networks priority services (NGN-PS) TLV element.

5. The method of claim 1 wherein the at least one message related attribute includes a Diameter interface associated with the ingress message, a related connection or path identifier associated with the ingress message, an origination realm, an origination address, a destination realm, a destination address, a priority related TLV element in the ingress message, or a next generation networks priority services (NGN-PS) TLV element in the ingress message.

6. The method of claim 1 wherein processing the ingress message using the stateless decode algorithm or the stateful decode algorithm includes updating, as the ingress message is decoded, the validation information for indicating a validated portion of the ingress message.

7. The method of claim 6 wherein the validation information is usable by a subsequent decode algorithm to avoid revalidating the validated portion of the ingress message.

8. The method of claim 1 wherein the processing node includes a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, or a network device.

9. The method of claim 1 wherein the ingress message includes a Diameter message, a remote authentication dial in user service (RADIUS) message, a common open policy service (COPS) message, a link layer discovery protocol (LLDP) message, or an intermediate system to intermediate system (IS-IS) message.

10. A system for processing a message containing type-length-value (TLV) elements, the system comprising:
   a processing node, wherein the processing node shares validation information about an ingress message among decode algorithms, wherein the processing node comprising:
      at least one processor; and
      a message processing module (MPM) implemented using the at least one processor, wherein the MPM is configured for:
         receiving an ingress message containing a plurality of TLV elements;
         determining, using at least one message related attribute, whether the ingress message is to be processed using a stateless decode algorithm;
         in response to determining that the ingress message is to be processed using the stateless decode algorithm, processing the ingress message using the stateless decode algorithm, wherein the stateless decode algorithm uses pointer arithmetic and length values associated with the plurality of TLV elements to decode the ingress message;
         determining, using the stateless decode algorithm, whether the ingress message includes at least one TLV element indicating that the ingress message is to be further processed using a stateful decode algorithm; and
         in response to determining that the ingress message includes the at least one TLV element indicating that the ingress message is to be further processed using the stateful decode algorithm, processing the ingress message using the stateful decode algorithm.

11. The system of claim 10 wherein the MPM is configured for in response to determining that the ingress message does not include the at least one TLV element indicating that the ingress message is to be further processed using the stateful decode algorithm, discarding the ingress message when the processing node is experiencing an overload event.

12. The system of claim 10 wherein determining that the ingress message includes the at least one TLV element indicating that the ingress message is to be further processed using the stateful decode algorithm includes determining that the at least one TLV element is to be read multiple times or determining that the at least one TLV element indicates that the ingress message is to receive preferential treatment.

13. The system of claim 10 wherein the at least one TLV element includes a top-level TLV element, a nested TLV element, a priority related TLV element or a next generation networks priority services (NGN-PS) TLV element.

14. The system of claim 10 wherein the at least one message related attribute includes a Diameter interface associated with the ingress message, a related connection or path identifier associated with the ingress message, an origination realm, an origination address, a destination realm, a destination address, a priority related TLV element in the ingress message, or a next generation networks priority services (NGN-PS) TLV element in the ingress message.

15. The system of claim 10 wherein the MPM is configured for updating, as the ingress message is decoded, the validation information for indicating a validated portion of the ingress message.

16. The system of claim 15 wherein the validation information is usable by a subsequent decode algorithm to avoid revalidating the validated portion of the ingress message.

17. The system of claim 10 wherein the processing node includes a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, or a network device.

18. The system of claim 10 wherein the ingress message includes a Diameter message, a remote authentication dial in user service (RADIUS) message, a common open policy service (COPS) message, a link layer discovery protocol (LLDP) message, or an intermediate system to intermediate system (IS-IS) message.

19. A non-transitory computer readable medium comprising computer executable instructions embodied in the non-transitory computer readable medium that when executed by at least one processor of a computer cause the computer to perform steps comprising:
   at a processing node including at least one message processor, wherein the processing node shares validation information about an ingress message among decode algorithms:
      receiving the ingress message containing a plurality of TLV elements;
      determining, using at least one message related attribute, whether the ingress message is to be processed using a stateless decode algorithm;
      in response to determining that the ingress message is to be processed using the stateless decode algorithm, processing the ingress message using the stateless decode algorithm, wherein the stateless decode algorithm uses pointer arithmetic and length values associated with the plurality of TLV elements to decode the ingress message;
      determining, using the stateless decode algorithm, whether the ingress message includes at least one TLV element indicating that the ingress message is to be further processed using a stateful decode algorithm; and
      in response to determining that the ingress message includes the at least one TLV element indicating that the ingress message is to be further processed using the stateful decode algorithm, processing the ingress message using the stateful decode algorithm.

20. The non-transitory computer readable medium of 19 comprising additional computer executable instructions embodied in the non-transitory computer readable medium that when executed by the at least one processor of the computer cause the computer to perform steps comprising:
   in response to determining that the ingress message does not include the at least one TLV element indicating that the ingress message is to be further processed using the stateful decode algorithm, discarding the ingress message when the processing node is experiencing an overload event.

* * * * *

UNITED STATES PATENT AND TRADEMARK OFFICE
CERTIFICATE OF CORRECTION

PATENT NO. : 10,193,802 B2  
APPLICATION NO. : 15/267997  
DATED : January 29, 2019  
INVENTOR(S) : Zaidi et al.

Page 1 of 1

It is certified that error appears in the above-identified patent and that said Letters Patent is hereby corrected as shown below:

In the Specification

Column 10, Lines 23-33, delete "In some embodiments, MPF 206 may utilize one or more stateless decode algorithms to find TLV elements or other information that indicates message priority, e.g., one or more priority AVPs. For example, MPF 206 may use a stateless decode algorithm to quickly walk through ingress message 106 until a priority AVP is found. In some embodiments, if a system is experiencing an overload event, MPF 206 may utilize one or more stateless decode algorithms to identify and discard low priority messages without incurring the full cost of decoding such messages using a stateful decode algorithm." and insert the same on Column 10, Line 24, as a new paragraph.

In the Claims

Column 16, Line 54, Claim 20, delete "19" and insert -- claim 19 --, therefor.

Signed and Sealed this  
Twenty-first Day of January, 2020

Andrei Iancu  
*Director of the United States Patent and Trademark Office*